Aug. 25, 1942.   B. L. FAIRFAX   2,294,081
FISH LURE
Filed June 10, 1941
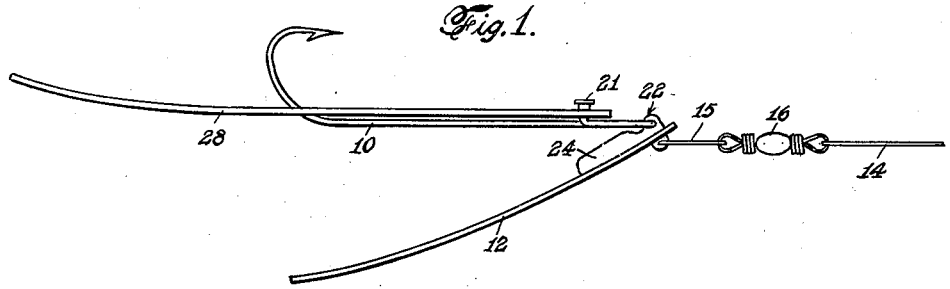
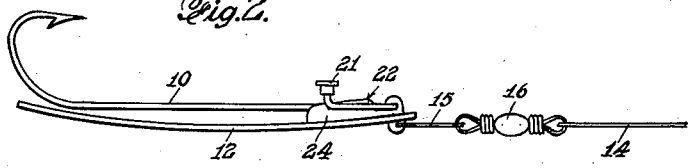
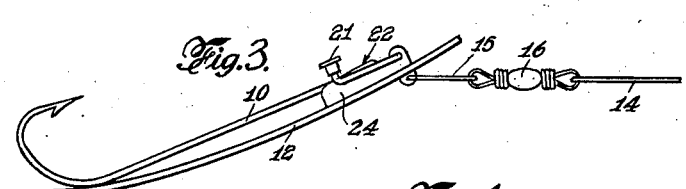
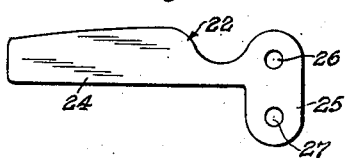
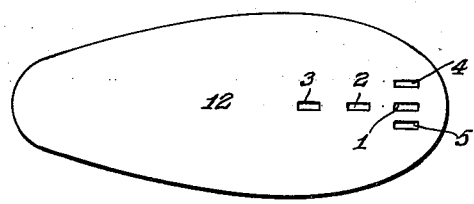
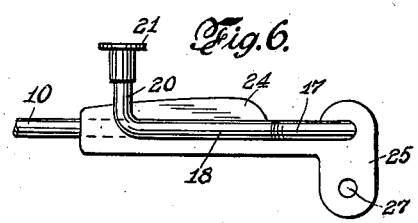
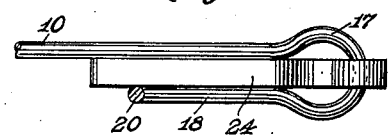
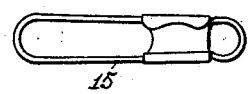
INVENTOR.
B. L. Fairfax
BY Williams, Rich & Morse
ATTORNEYS Patented Aug. 25, 1942

2,294,081

UNITED STATES PATENT OFFICE 2,294,081

FISH LURE

Bradford Lindsay Fairfax, Fishkill Village, N. Y.

Application June 10, 1941, Serial No. 397,357

10 Claims. (Cl. 43—45)

This invention relates to fish lures and has particular reference to that spinner type of lure wherein a blade and a hook are hingedly connected together at their forward ends and are adapted to rotate in unison as the lure is drawn through the water.

An important object of the present invention is to provide improved means whereby the blade and hook may be quickly anchored to each other in a fixed relation, thus enabling one at will to transform the lure from a spinner type bait into a wobbler type bait, the anchoring means being such, of course, that it may also be quickly released, at will, when it is desired to re-convert the lure into a spinner type bait and being also such that a fish upon delivering a strike will effect its release so as to obviate any leverage that the blade might otherwise afford the fish in its effort to free itself from the hook.

Another object of the invention is to make readily possible several variations in assembly relationship of the hook and blade which are such as will enable the lure, when employed as a wobbler type bait, to operate in a distinct manner in each instance.

Further objects of the invention are to provide improved means whereby the hook is maintained at all times in a right angle relationship to the blade; and to provide improved means whereby a pork-rind strip, or the equivalent of such, may be readily attached to and detached from the lure.

Other objects and advantages of the invention will become apparent from the following description when taken in connection with the accompanying drawing in which—

Fig. 1 is a view showing in elevation a fish lure embodying the invention and conditioned for operation as a spinner;

Fig. 2 is a view similar to that of Fig. 1 and showing the lure conditioned to function as a wobbler type bait, the hook and blade being illustrated in one of several possible assembly relationships;

Fig. 3 is a view similar to that of Fig. 1 and showing the lure conditioned to function as a wobbler type bait, the hook and blade being illustrated in another one of several possible assembly relationships;

Fig. 4 is a plan view of the blade appearing in Figs. 1 to 3;

Fig. 5 is a side elevation of the connector head which is shown in Figs. 1 to 3 and by which the hook and blade are maintained in an assembled relation;

Fig. 6 is a fragmental view showing the connector head frictionally retained, as in Figs. 2 and 3, in a given position with relation to the shank of the hook;

Fig. 7 is a plan view of the connector head and such portion of the hook as appears in Figure 6;

Fig. 8 is a view showing in elevation an appropriate type of conventional link or snap for use as a blade retaining member and as a medium by which the lure may be conveniently attached to a fishing line.

Referring to the drawing, it will be observed that the lure embodying the present invention comprises essentially a hook 10 and a blade 12 hingedly connected together at their forward ends, the hook-and-blade unit being adapted to be attached to a fishing line 14 through the medium of a suitable connector, herein shown as comprising a conventional snap hook 15 in association with a so-called barrel swivel 16.

As shown most clearly in Figures 6 and 7, the shank of the hook 10 is so bent as to provide a loop-eye 17, having a rearwardly extending leg portion serving as a spring finger 18 disposed in a parallel relation to the hook shank and adapted to function in conjunction with such shank as a spring clamp for the purpose hereinafter more particularly described. The spring finger 18 is bent upwardly, as shown in Figs. 1, 2, 3 and 6, to provide a pin-like arbor 20, which is disposed at right angles to the shank of the hook and is adapted to receive a button-like element, such as a tubular rivet 21, the cylindrical or body portion of which is suitably secured to the arbor in surrounding relation thereto and the head portion of which is spaced a suitable distance from the hook shank for the purpose which will hereinafter more clearly appear.

With the hook 10 there is associated a connector head 22, which, generally speaking, is L-shaped in that it includes a retaining arm 24 from which projects at substantially right angles thereto a keeper-lug 25. The connector head 22 is provided at its front end with a pair of openings 26 and 27, the former of which is located in the general vicinity of the juncture of the retaining arm 24 and the keeper-lug 25 and the latter of which is located at the lower end of the keeper-lug. As will be readily understood, the connector head 22 is assembled on the hook 10 by passing the arbor 20 and the spring finger 18 through the opening 26 prior to placing the rivet 21 on the arbor. The relationship of the hook 10 and connector head 22, when these elements are assembled, is such as to provide a hinge connection therebetween so as to permit the retaining arm 24 of the connector head to be moved at will into and out of a position intermediate the hook shank and the spring finger 18, which shank and finger are so disposed with relation to each other that they are adapted to impinge on the retaining arm and frictionally hold it in its position shown in Figs. 2, 3, 6 and 7.

Referring particularly to Fig. 4, it is to be noted that the blade 12 is provided at its front end with a group of slots 1, 2, 3, 4 and 5, slots 1, 2 and 3 being disposed on the longitudinal center line of the blade at varying distances from the extreme front end thereof and slots 4 and 5 being disposed off center with respect to said center line but in transverse alignment with the front slot 1. Each of the slots 1 to 5 is of such dimensions that it will snugly receive the keeper-lug 25, with the result that, when the lug is introduced into any one of these slots, the blade 12 will assume a contiguous relation to the underneath face of the retaining arm 24, in which relation the blade is maintained by passing the spring arm of the snap 15 through the opening 27 of the connector head 22 and thereafter latching such arm in closed position, the latch and its associated swivel 16 being then adapted to afford a dependable connection between the line 14 and the lure as a whole.

It is to be observed that the lure may be conditioned for use as a spinner type bait, adapted to operate beneath the surface of the water, by utilizing the front slot 1 of the blade 12 in attaching that blade to the connector head 22 and by so positioning the connector head as to afford a free hinge connection between itself and the eye of the hook as is clearly illustrated in Fig. 1. When the lure is employed as a spinner type bait, there is a tendency for the blade 12, due to the pull exerted thereon by the line 14, to assume a substantially perpendicular relation to the general direction of pull on the line. However, as the lure is moved through the water the blade 12 assumes an acute angle to the direction of pull on the line 14, as illustrated in Fig. 1, and is caused to rotate at that angle and in unison with the hook 10.

In order to transform the lure from a spinner type bait into a wobbler type bait, as shown in Fig. 2, which is adapted to operate on a substantially even keel beneath the surface of the water, such transformation may be effected by simply moving the connector head 22 into such a position with relation to the hook 10 that the retaining arm 24 enters between and is engaged by the hook shank and its associated spring finger 18, the hook shank and spring finger being so disposed with relation to each other that they are adapted to impinge on the retaining arm with sufficient force to frictionally hold it against accidental displacement. It is to be noted, however, that the retaining arm 24 may be readily released in order to transform the lure from a wobbler type bait into a spinner type bait and may also be readily released by a fish, incident to its delivery of a strike, so as to permit the blade to swing away from the shank of the hook and thus obviate any leverage that the blade might otherwise afford the fish in its effort to free itself from the hook.

In Fig. 3 the assembly relationship of the hook 10 and blade 12 is substantially like that of Fig. 2 except for the fact that the slot 2 of the blade is utilized in connecting the blade to the hook. The action of the lure of Fig. 3 is peculiar in that it tends, while undergoing a wobbling movement, to ride the surface of the water with its front end projecting out of the water, thus producing to some extent a skimming or so-called skittering effect.

By utilizing the slot 3 of the blade 12, an assembly relationship of the hook and blade, comparable with the assembly relationship described in connection with Fig. 3, may be attained. However, by utilizing the slot 3 a more pronounced tendency of the lure to ride the surface of the water is realized and hence a more pronounced skimming or skittering action of the lure is effected.

By utilizing either the slot 4 or the slot 5 of the blade 12, an assembly relationship of the hook and blade may be established which is comparable with the hook and blade relationship of Fig. 2. However, since each of the slots 4 and 5 is off center with respect to the longitudinal center line of the blade 12, it follows that the pull of the line 14 will be exerted on the lure in an off center relation to the blade, with the result that the lure, as it is moved through the water in the general direction of pull exerted by the line, will veer to the right or the left, depending upon whether the slot 4 or the slot 5 is utilized, while undergoing an under-water wobbling action like, or substantially like which is peculiar to the lure of Fig. 2.

Regardless of whether the lure is conditioned for use as a spinner type bait or as a wobbler type bait, such lure is adapted for use with a flexible element, such as a pork-rind strip 28 or its equivalent. The pork-rind strip 28 is herein illustrated as of conventional design in that it is provided at its front end and at a point intermediate its ends with slots or apertures, not shown, the slot or aperture at the front end being adapted to receive the button-like element or rivet 21 and the intermediate slot or aperture being adapted to receive the curved end of the hook 10 so as to enable the strip to assume a contiguous relation to the shank of the hook while its front end is effectively retained intermediate the hook shank and the rivet head.

It is to be observed that regardless of whether the lure is employed as a spinner type bait or as a wobbler type bait, the hook 10 and blade 12 are at all times maintained in a right angle relation to each other so as to insure a greater probability of hooking a fish incident to the strike than would be possible were the hook then tilted on its shank-axis to some other and consequently less effective position. This highly important right-angle relationship of the hook 10 and blade 12 is insured by reason of the fact that the opening 26 of the connector head 22 is of such diameter, with relation to the diameter of the wire from which the hook is formed, that the eye of the hook is held against displacement on the axis of the hook shank even though the connection afforded between the connector head and the eye of the hook is such as to afford a free hinge movement between the hook and blade as and for the purpose described.

Although only one form of lure embodying the present invention is herein shown and described, it will be understood that various changes may be made without departing from the spirit of the invention on the scope of the following claims.

I claim:

1. A fish lure comprising a blade, a hook having a shank, and a connection joining said blade and hook together at their front ends and including a connector head hingedly connected to said hook and supporting said blade for movement toward and away from said shank while retaining said hook against rotation with relation to said blade.

2. A fish lure comprising a blade, a hook having a shank, a connection joining said blade and hook together at their front ends and including a connector head supported by said hook for movement about a pivot point into and out of a contiguous relation to said shank and supporting said blade for like movement with relation to said shank; and retaining means in direct association with said hook and adapted to engage said head when in a contiguous relation to said shank and there temporarily retain it together with said blade in such relation.

3. A fish lure comprising a blade, a hook having a shank, a connection joining said blade and hook together at their front ends and including a connector head supported by said hook for movement about a pivot point into and out of a contiguous relation to said shank and supporting said blade for like movement with relation to said shank, and retaining means including a spring finger in direct association with said shank and cooperating therewith to engage said head when in a contiguous relation to said shank and there temporarily retain it together with said blade in such relation.

4. A fish lure comprising a blade having a plurality of openings, a hook adapted to be associated with said blade to effect a plurality of distinct assembly relationships corresponding in number to the number of said openings, and a connector head carried by said hook and provided with a retaining lug dimensioned to respectively enter said openings and cooperating with said blade to retain it in an assembled relation to said hook.

5. A fish lure comprising a blade having a plurality of openings, a hook adapted to be associated with said blade to effect a plurality of distinct assembly relationships corresponding in number to the number of said openings, a connector head carried by said hook and provided with a retaining lug dimensioned to respectively enter said openings and cooperating with said blade to retain it in an assembled relation to said hook, and line attaching means connected to said retaining lug and cooperating with that lug to maintain said blade in an assembled relation thereto.

6. A fish lure comprising a blade, a hook having a shank, a connector head hingedly joining said blade and hook together at their front ends and including a retaining arm adapted to be moved into and out of a contiguous relation to said shank and provided with a retaining lug on which said blade is carried for movement along with said arm, and retaining means including a spring finger between which and said shank said retaining arm is adapted to enter as it is moved into a contiguous relation to said shank and by which in cooperation with said shank said arm is temporarily maintained together with said blade in a contiguous relation to said shank.

7. A fish lure comprising a blade having at one end thereof a plurality of openings laterally spaced from each other, a hook having a shank and adapted to be associated with said blade to effect a plurality of distinct assembly relationships corresponding in number to the number of said openings, a connector head hingedly joining said blade and hook together at their front ends and including a retaining arm adapted to be moved into and out of a contiguous relation to said shank and provided with a retaining lug dimensioned to respectively enter said openings and on which said blade is carried for movement along with said arm, and retaining means including a spring finger between which and said shank said retaining arm is adapted to enter as it is moved into a contiguous relation to said shank and by which in cooperation with said shank said arm is temporarily maintained together with said blade in a contiguous relation to said shank.

8. For use in a fish lure of the type wherein a pork rind is employed, a fish hook having a shank looped to provide an eye in conjunction with a finger extending rearwardly from said eye toward the bend of the hook and terminating in an arbor disposed transversely of said shaft and carrying a button-like element adapted to receive and facilitate the fastening of a pork rind strip in a contiguous relation to said shank.

9. For use in a fish lure of the type wherein a pork rind is employed, a fish hook having a shank looped to provide an eye in conjunction with a finger extending rearwardly from said eye toward the bend of the hook and terminating in an arbor disposed transversely of said shaft and carrying a button-like element adapted to receive and facilitate the fastening of a pork rind strip in a contiguous relation to said shank, said button-like element consisting of a tubular rivet mounted on and secured to said arbor with its head portion in a spaced relation to said shank.

10. A fish lure comprising a blade having therein an opening, a hook adapted to be associated with said blade, a connector head carried by said hook and provided with a retaining lug dimensioned to enter said opening and cooperating with said blade to retain it in an assembled relation to said hook, and line attaching means connected to said retaining lug and cooperating with that lug to maintain said blade in an assembled relation thereto.

BRADFORD LINDSAY FAIRFAX.